US 7,870,843 B2

(12) United States Patent
Wiggins et al.

(10) Patent No.: US 7,870,843 B2
(45) Date of Patent: Jan. 18, 2011

(54) TORQUE CONTROL SYSTEM WITH SCAVENGING

(75) Inventors: Layne K. Wiggins, Plymouth, MI (US); Michael Livshiz, Ann Arbor, MI (US); Jeffrey M. Kaiser, Highland, MI (US); Henrik Nordin, Sundbyberg (SE)

(73) Assignee: GM Global Technology Operations, Inc.

( * ) Notice: Subject to any disclaimer, the term of this patent is extended or adjusted under 35 U.S.C. 154(b) by 157 days.

(21) Appl. No.: 12/391,352

(22) Filed: Feb. 24, 2009

(65) Prior Publication Data

US 2010/0131174 A1 May 27, 2010

Related U.S. Application Data

(60) Provisional application No. 61/118,125, filed on Nov. 26, 2008.

(51) Int. Cl.
*F04D 13/04* (2006.01)
*F02D 41/00* (2006.01)

(52) U.S. Cl. ..................... 123/321; 123/698

(58) Field of Classification Search ............. 123/90.15, 123/90.16, 321, 345–348, 698, 516
See application file for complete search history.

(56) References Cited

U.S. PATENT DOCUMENTS

| 5,396,874 | A  * | 3/1995  | Hitomi et al. ........... 123/559.1 |
| 6,053,134 | A  * | 4/2000  | Linebarger .............. 123/90.16 |
| 6,257,190 | B1 * | 7/2001  | Linebarger .............. 123/188.3 |
| 7,185,557 | B2 * | 3/2007  | Venettozzi ................. 74/602 |
| 7,766,708 | B2 * | 8/2010  | Akuzawa .................... 440/1 |
| 2008/0017150 | A1 * | 1/2008  | Tsuchida et al. ......... 123/90.17 |
| 2008/0149055 | A1 * | 6/2008  | Canino et al. ........... 123/90.12 |
| 2009/0277434 | A1 * | 11/2009 | Surnilla .................... 123/65 R |
| 2010/0000491 | A1 * | 1/2010  | Tinder ...................... 123/205 |

* cited by examiner

*Primary Examiner*—John T Kwon

(57) ABSTRACT

An engine control system includes a scavenging module that generates a scavenging signal when both a driver torque request is greater than a predetermined torque threshold and a rotational speed of an engine crankshaft is less than a predetermined speed threshold. A cam phaser control module controls intake and exhaust cam phasers based on the scavenging signal such that opening times of intake and exhaust valves of a respective cylinder overlap.

14 Claims, 5 Drawing Sheets

TORQUE CONTROL SYSTEM WITH SCAVENGING

CROSS-REFERENCE TO RELATED APPLICATIONS

This application claims the benefit of U.S. Provisional Application No. 61/118,125, filed on Nov. 26, 2008. The disclosure of the above application is incorporated herein by reference.

FIELD

The present disclosure relates to engine torque control systems and more particularly to torque control systems for turbocharged, spark-ignition direct-injection (SIDI) engines.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into gasoline engines is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air and fuel (A/F) mixture to the cylinders. Increasing the amount of air and fuel provided to the cylinders increases the torque output of the engine.

Engine control systems have been developed to control engine torque output to achieve a desired torque. Traditional engine control systems, however, do not control the engine torque output as accurately as desired. Further, traditional engine control systems do not provide a rapid response to control signals or coordinate engine torque control among various devices that affect the engine torque output.

SUMMARY

An engine control system includes a scavenging module that generates a scavenging signal when both a driver torque request is greater than a predetermined torque threshold and a rotational speed of an engine crankshaft is less than a predetermined speed threshold. A cam phaser control module controls intake and exhaust cam phasers based on the scavenging signal such that opening times of intake and exhaust valves of a respective cylinder overlap.

A method includes generating a scavenging signal when both a driver torque request is greater than a predetermined torque threshold and a rotational speed of an engine crankshaft is less than a predetermined speed threshold, and controlling intake and exhaust cam phasers based on the scavenging signal such that opening times of intake and exhaust valves of a respective cylinder overlap.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
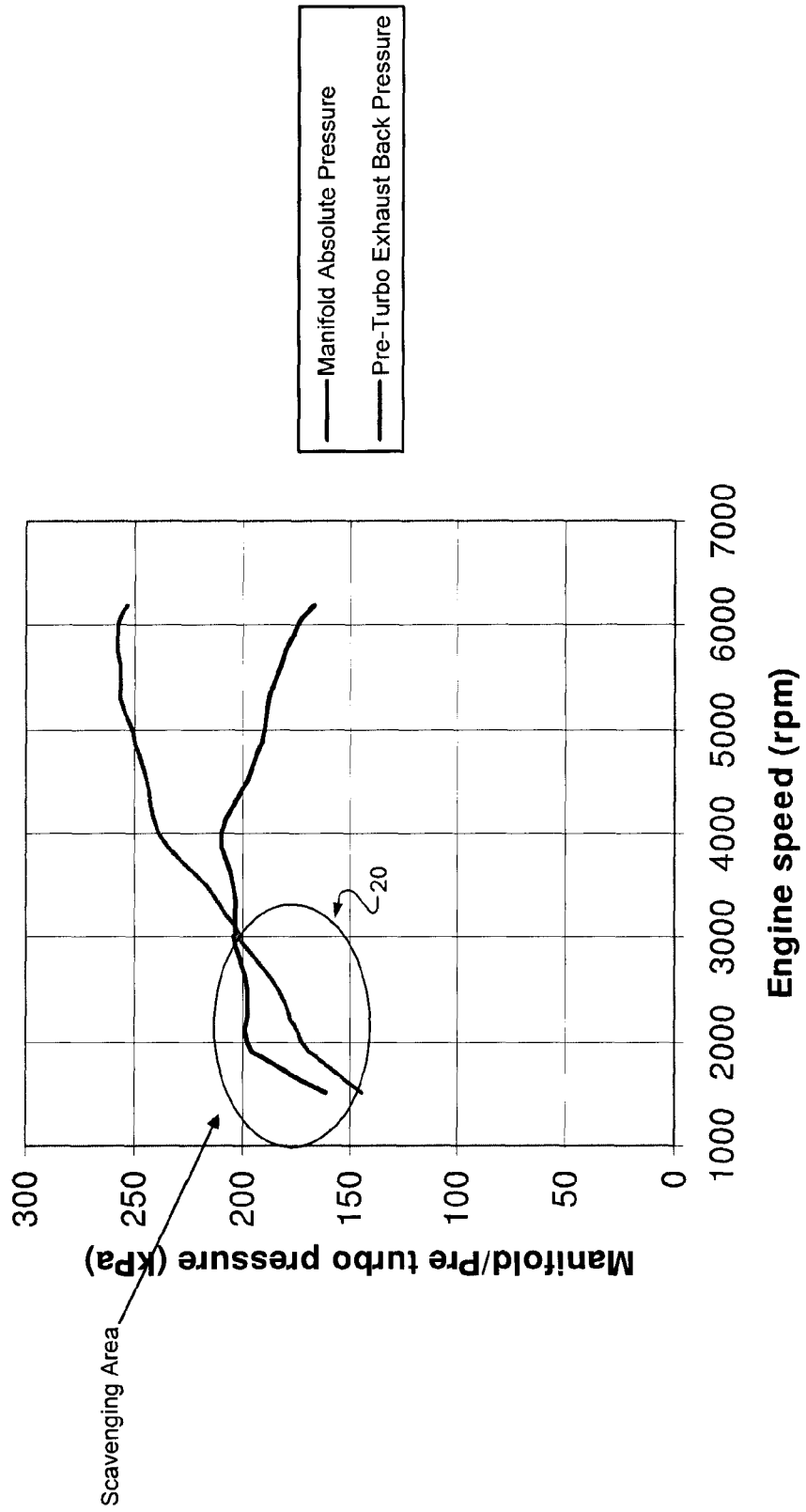
FIG. 1 is a graph illustrating intake and exhaust pressure as a function of engine RPM according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Turbocharged engines pressurize air that is drawn into an intake manifold. Thus, a pressure difference may exist between the air in the intake manifold (i.e. pre-combustion) and exhaust gas in an exhaust manifold (i.e. post-combustion). For example, the intake manifold pressure may be higher than the exhaust manifold pressure.

Engines that include variable cam phasing and/or variable valve control may selectively open intake and exhaust valves. For example only, an engine may selectively open intake and exhaust valves via cam phasers or energized solenoids. Opening intake and exhaust valves simultaneously in a turbocharged engine may allow higher pressure air in the intake manifold to flow through the cylinder towards the lower pressure exhaust gas in the exhaust manifold.

The flow of air through the cylinder may remove excess exhaust gas from a previous combustion cycle. Therefore, the air in the cylinder during the next combustion cycle may be cleaner air because the excess exhaust gas normally present would be removed. The cleaner air in the cylinder may allow for more fuel to be injected, thus maintaining a stoichiometric air/fuel (A/F) ratio. The combustion of the increased amount of A/F mixture may increase torque output of the engine.

The process described above, hereinafter referred to as "scavenging," may be limited to spark-ignition, direct-injection (SIDI) engines because SIDI engines may selectively control fuel injectors. The selective control of the fuel injectors may prevent fuel from entering the exhaust stream while exhaust valves are open. Conversely, port-injection engines combine air and fuel before distributing the A/F mixture to the cylinders. Therefore, scavenging in port-injection engines may result in an A/F mixture passing through the cylinder and into the exhaust stream. The fuel in the exhaust stream may cause problems such as increased emissions and catalytic converter damage.

The cleaner air available for combustion may also result in more exhaust gas after combustion. This may also be referred to as increased exhaust back pressure. The increased exhaust back pressure may improve a spooling time of the turbocharger. The faster spooling may result in less turbo lag, which refers to an amount of time required for the turbocharger to achieve full spool.

Referring now to FIG. 1, a graph 10 illustrating intake manifold pressure and exhaust manifold back pressure as a function of engine crankshaft revolutions per minute (RPM) levels is shown. Scavenging may be limited to low engine RPM levels, as shown by a scavenging area 20. For example, scavenging may be limited to engine speeds of 2500 RPM or less because at higher engine RPM levels there is more than enough exhaust gas to power the turbocharger.

An engine may enable scavenging at low RPM levels if a torque request exceeds an available torque reserve. In order to enable scavenging, cam phaser scheduling may be modified to provide for periods when intake and exhaust valves are simultaneously opened and thus cylinders may be scavenged. Therefore, the engine may switch between a normal cam phaser schedule and a scavenging cam phaser schedule based on the torque request, the available torque output, and the engine RPM level.

Additionally, A/F ratio scheduling may be modified when scavenging is enabled. For example, an amount of fuel injected into a cylinder may be increased to compensate for the increased amount of air (i.e. the cleaner air) available for combustion. However, when A/F ratio scheduling is modified, spark control may also be modified to compensate for the A/F ratio change.

Figure 2:
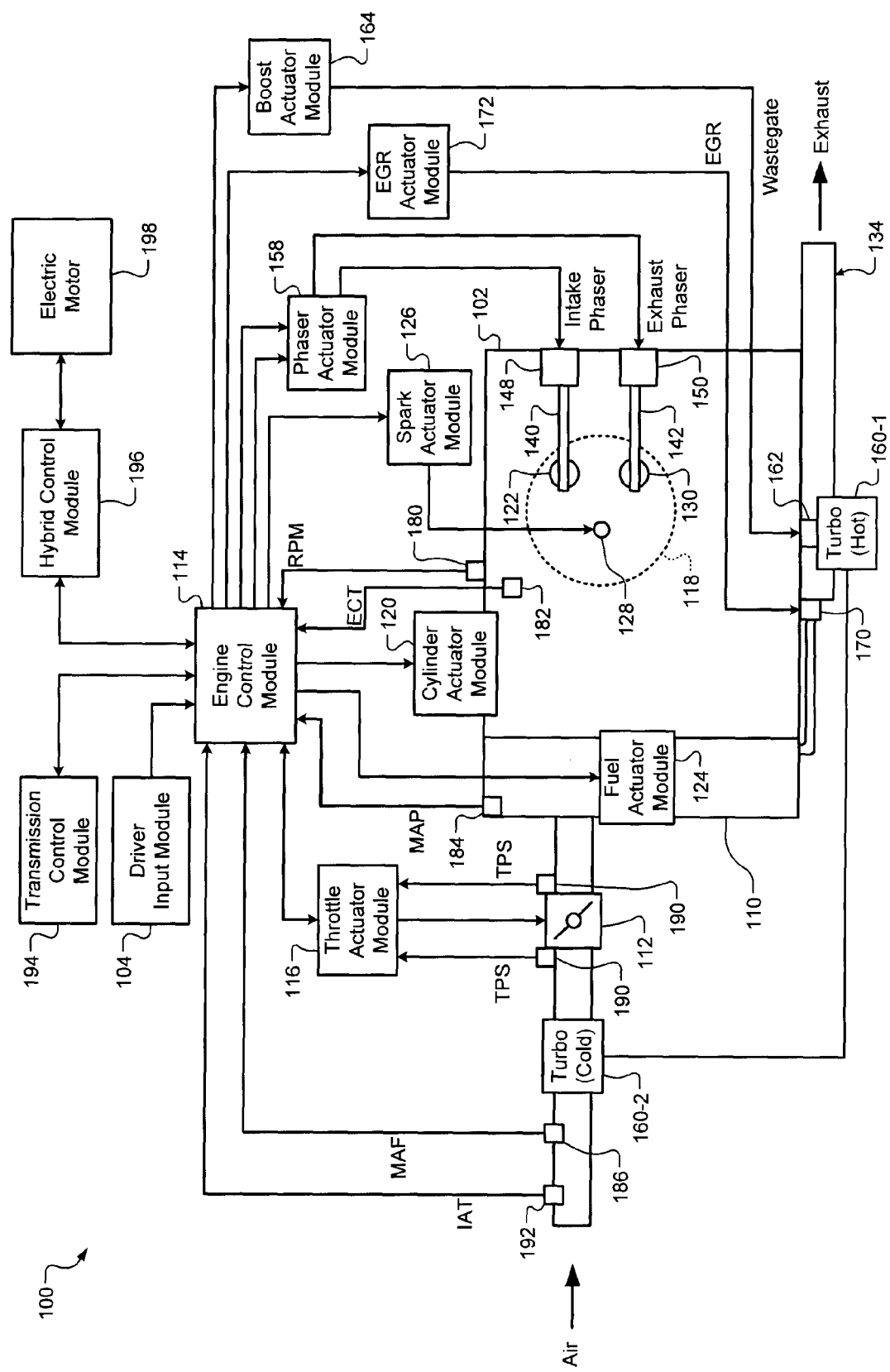
FIG. 2 is a functional block diagram of an exemplary engine system according to the present disclosure.

Referring now to FIG. 2, a functional block diagram of an exemplary engine system 100 is presented. The engine system 100 includes an engine 102 that combusts an A/F mixture to produce drive torque for a vehicle based on a driver input module 104. Air is drawn into an intake manifold 110 through a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

Air from the intake manifold 110 is drawn into the cylinder 118 through an intake valve 122. The ECM 114 controls a fuel actuator module 124, which regulates fuel injection to achieve a desired A/F ratio. Fuel may be injected into the intake manifold 110 at a central location or at multiple locations, such as near the intake valve of each of the cylinders. In various implementations not depicted in FIG. 1, fuel may be injected directly into the cylinders or into mixing chambers associated with the cylinders. The fuel actuator module 124 may halt injection of fuel to cylinders that are deactivated.

The injected fuel mixes with air and creates an A/F mixture in the cylinder 118. A piston (not shown) within the cylinder 118 compresses the A/F mixture. Based upon a signal from the ECM 114, a spark actuator module 126 energizes a spark plug 128 in the cylinder 118, which ignites the A/F mixture. The timing of the spark may be specified relative to the time when the piston is at its topmost position, referred to as top dead center (TDC).

The combustion of the A/F mixture drives the piston down, thereby driving a rotating crankshaft (not shown). The piston then begins moving up again and expels the byproducts of combustion through an exhaust valve 130. The byproducts of combustion are exhausted from the vehicle via an exhaust system 134.

The spark actuator module 126 may be controlled by a timing signal indicating how far before or after TDC the spark should be provided. Operation of the spark actuator module 126 may therefore be synchronized with crankshaft rotation. In various implementations, the spark actuator module 126 may halt provision of spark to deactivated cylinders.

The intake valve 122 may be controlled by an intake camshaft 140, while the exhaust valve 130 may be controlled by an exhaust camshaft 142. In various implementations, multiple intake camshafts may control multiple intake valves per cylinder and/or may control the intake valves of multiple banks of cylinders. Similarly, multiple exhaust camshafts may control multiple exhaust valves per cylinder and/or may control exhaust valves for multiple banks of cylinders. The cylinder actuator module 120 may deactivate the cylinder 118 by disabling opening of the intake valve 122 and/or the exhaust valve 130.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 controls the intake cam phaser 148 and the exhaust cam phaser 150 based on signals from the ECM 114. When implemented, variable valve lift may also be controlled by the phaser actuator module 158.

The engine system 100 may include a boost device that provides pressurized air to the intake manifold 110. For example, FIG. 2 shows a turbocharger 160 that includes a hot turbine 160-1 that is powered by hot exhaust gases flowing through the exhaust system 134. The turbocharger 160 also includes a cold air compressor 160-2, driven by the turbine 160-1, that compresses air leading into the throttle valve 112. In various implementations, a supercharger, driven by the crankshaft, may compress air from the throttle valve 112 and deliver the compressed air to the intake manifold 110.

A wastegate 162 may allow exhaust gas to bypass the turbocharger 160, thereby reducing the boost (the amount of intake air compression) of the turbocharger 160. The ECM 114 controls the turbocharger 160 via a boost actuator module 164. The boost actuator module 164 may modulate the boost of the turbocharger 160 by controlling the position of the wastegate 162. In various implementations, multiple turbochargers may be controlled by the boost actuator module 164. The turbocharger 160 may have variable geometry, which may be controlled by the boost actuator module 164.

An intercooler (not shown) may dissipate some of the compressed air charge's heat, which is generated as the air is compressed. The compressed air charge may also have absorbed heat because of the air's proximity to the exhaust system 134. Although shown separated for purposes of illustration, the turbine 160-1 and the compressor 160-2 are often attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger 160. The EGR valve 170 may be controlled by an EGR actuator module 172.

The engine system 100 may measure the speed of the crankshaft in revolutions per minute (RPM) using an RPM sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module 194 to coordinate shifting gears in a transmission (not shown). For example, the ECM 114 may reduce engine torque during a gear shift. The ECM 114 may communicate with a hybrid control module 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the transmission control module 194, and the hybrid control module 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 2, the throttle actuator module 116 achieves the throttle opening area by adjusting the angle of the blade of the throttle valve 112.

Similarly, the spark actuator module 126 may be referred to as an actuator, while the corresponding actuator value may be the amount of spark advance relative to cylinder TDC. Other actuators may include the boost actuator module 164, the EGR actuator module 172, the phaser actuator module 158, the fuel actuator module 124, and the cylinder actuator module 120. For these actuators, the actuator values may correspond to boost pressure, EGR valve opening area, intake and exhaust cam phaser angles, fueling rate, and number of cylinders activated, respectively. The ECM 114 may control actuator values in order to generate a desired torque from the engine 102.

Figure 3:
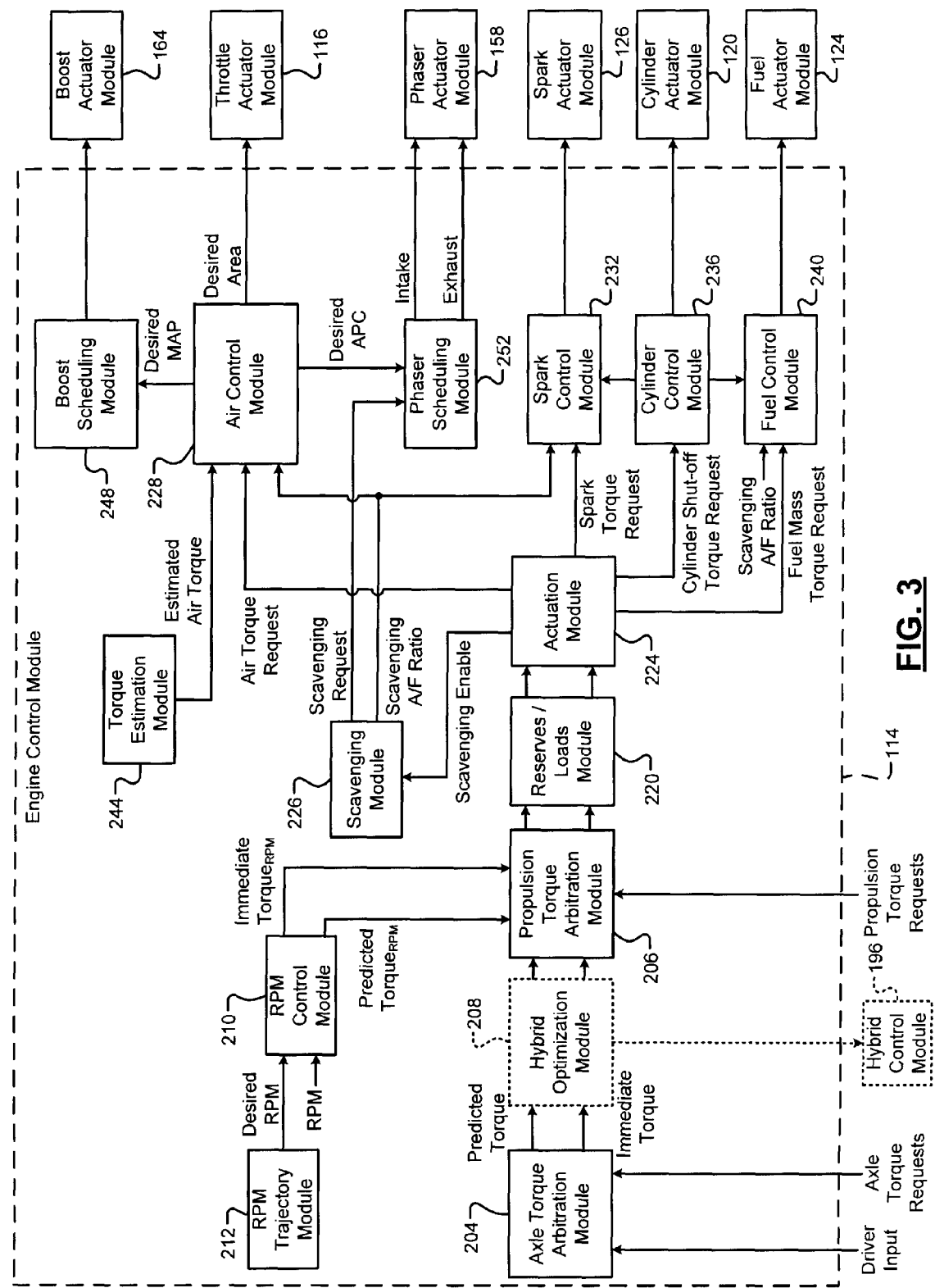
FIG. 3 is a functional block diagram of an exemplary engine control system according to the present disclosure.

Referring now to FIG. 3, a functional block diagram of an exemplary engine control system is presented. An exemplary implementation of the ECM 114 includes an axle torque arbitration module 204. The axle torque arbitration module 204 arbitrates between a driver input from the driver input module 104 and other axle torque requests. For example, the driver input may be based on a position of an accelerator pedal. The driver input may also be based on a cruise control module, which may be an adaptive cruise control system that varies vehicle speed to maintain a predetermined following distance.

Torque requests may include target torque values as well as ramp requests, such as a request to ramp torque down to a minimum engine off torque or to ramp torque up from the minimum engine off torque. Axle torque requests may include a torque reduction requested during wheel slip by a traction control system. Axle torque requests may also include torque request increases to counteract negative wheel slip, where a tire of the vehicle slips with respect to the road surface because the axle torque is negative.

Axle torque requests may also include brake management requests and vehicle over-speed torque requests. Brake management requests may reduce engine torque to ensure that the engine torque output does not exceed the ability of the brakes to hold the vehicle when the vehicle is stopped. Vehicle over-speed torque requests may reduce the engine torque output to prevent the vehicle from exceeding a predetermined speed. Axle torque requests may also be made by body stability control systems. Axle torque requests may further include engine shutoff requests, such as may be generated when a critical fault is detected.

The axle torque arbitration module 204 outputs a predicted torque and an immediate torque based on the results of arbitrating between the received torque requests. The predicted torque is the amount of torque that the ECM 114 prepares the engine 102 to generate, and may often be based on the driver's torque request. The immediate torque is the amount of currently desired torque, which may be less than the predicted torque.

The immediate torque may be less than the predicted torque to provide torque reserves, as described in more detail below, and to meet temporary torque reductions. For example only, temporary torque reductions may be requested when a vehicle speed is approaching an over-speed threshold and/or when the traction control system senses wheel slippage.

The immediate torque may be achieved by varying engine actuators that respond quickly, while slower engine actuators may be used to prepare for the predicted torque. For example, in a gas engine, spark advance may be adjusted quickly, while air flow and cam phaser position may be slower to respond because of mechanical lag time. Further, changes in air flow are subject to air transport delays in the intake manifold. In addition, changes in air flow are not manifested as torque variations until air has been drawn into a cylinder, compressed, and combusted.

A torque reserve may be created by setting slower engine actuators to produce a predicted torque, while setting faster engine actuators to produce an immediate torque that is less than the predicted torque. For example, the throttle valve 112 can be opened, thereby increasing air flow and preparing to produce the predicted torque. Meanwhile, the spark advance may be reduced (in other words, spark timing may be retarded), reducing the actual engine torque output to the immediate torque.

The difference between the predicted and immediate torques may be called the torque reserve. When a torque reserve is present, the engine torque can be quickly increased from the immediate torque to the predicted torque by changing a faster actuator. The predicted torque is thereby achieved without waiting for a change in torque to result from an adjustment of one of the slower actuators.

The axle torque arbitration module 204 may output the predicted torque and the immediate torque to a propulsion torque arbitration module 206. In various implementations, the axle torque arbitration module 204 may output the predicted torque and immediate torque to a hybrid optimization module 208. The hybrid optimization module 208 determines how much torque should be produced by the engine 102 and how much torque should be produced by the electric motor 198. The hybrid optimization module 208 then outputs modified predicted and immediate torque values to the propulsion torque arbitration module 206. In various implementations, the hybrid optimization module 208 may be implemented in the hybrid control module 196.

The predicted and immediate torques received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests, including the converted predicted and immediate torques. The propulsion torque arbitration module 206 may generate an arbitrated predicted torque and an arbitrated immediate torque. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by the transmission control module 194 to accommodate gear shifts. Propulsion torque requests may also result from clutch fuel cutoff, which may reduce the engine torque output when the driver depresses the clutch pedal in a manual transmission vehicle.

Propulsion torque requests may also include an engine shutoff request, which may be initiated when a critical fault is detected. For example only, critical faults may include detection of vehicle theft, a stuck starter motor, electronic throttle control problems, and unexpected torque increases. For example only, engine shutoff requests may always win arbitration, thereby being output as the arbitrated torques, or may bypass arbitration altogether, simply shutting down the engine. The propulsion torque arbitration module 206 may still receive these shutoff requests so that, for example, appropriate data can be fed back to other torque requestors. For example, all other torque requestors may be informed that they have lost arbitration.

An RPM control module 210 may also output predicted and immediate torque requests to the propulsion torque arbitration module 206. The torque requests from the RPM control module 210 may prevail in arbitration when the ECM 114 is in an RPM mode. RPM mode may be selected when the driver removes their foot from the accelerator pedal, such as when the vehicle is idling or coasting down from a higher speed. Alternatively or additionally, RPM mode may be selected when the predicted torque requested by the axle torque arbitration module 204 is less than a calibratable torque value.

The RPM control module 210 receives a desired RPM from an RPM trajectory module 212, and controls the predicted and immediate torque requests to reduce the difference between the desired RPM and the actual RPM. For example only, the RPM trajectory module 212 may output a linearly decreasing desired RPM for vehicle coastdown until an idle RPM is reached. The RPM trajectory module 212 may then continue outputting the idle RPM as the desired RPM.

A reserves/loads module 220 receives the arbitrated predicted and immediate torque requests from the propulsion torque arbitration module 206. Various engine operating conditions may affect the engine torque output. In response to these conditions, the reserves/loads module 220 may create a torque reserve by increasing the predicted torque request.

For example only, a catalyst light-off process or a cold start emissions reduction process may directly vary spark advance for an engine. The reserves/loads module 220 may therefore increase the predicted torque request to counteract the effect of that spark advance on the engine torque output. In another example, the A/F ratio of the engine and/or the mass air flow may be directly varied, such as by diagnostic intrusive equivalence ratio testing and/or new engine purging. Corresponding predicted torque requests may be made to offset changes in the engine torque output during these processes.

The reserves/loads module 220 may also create a reserve in anticipation of a future load, such as the engagement of the air conditioning compressor clutch or power steering pump operation. The reserve for air conditioning (A/C) clutch engagement may be created when the driver first requests air conditioning. Then, when the A/C clutch engages, the reserves/loads module 220 may add the expected load of the A/C clutch to the immediate torque request.

An actuation module 224 receives the predicted and immediate torque requests from the reserves/loads module 220. The actuation module 224 determines how the predicted and immediate torque requests will be achieved. The actuation module 224 may be engine type specific, with different control schemes for gas engines versus diesel engines. In various implementations, the actuation module 224 may define the boundary between modules prior to the actuation module 224, which are engine independent, and modules that are engine dependent.

For example, in a gas engine, the actuation module 224 may vary the opening of the throttle valve 112, which allows for a wide range of torque control. However, opening and closing the throttle valve 112 results in a relatively slow change in torque. Disabling cylinders also provides for a wide range of torque control, but may be similarly slow and additionally involve drivability and emissions concerns. Changing spark advance is relatively fast, but does not provide as much range of torque control. In addition, the amount of torque control possible with spark (referred to as spark capacity) changes as the air per cylinder changes.

In various implementations, the actuation module 224 may generate an air torque request based on the predicted torque request. The air torque request may be equal to the predicted torque request, causing air flow to be set so that the predicted torque request can be achieved by changes to other actuators. Additionally, the actuation module 224 may enable scavenging by generating a scavenging enable signal.

A scavenging module 226 enables scavenging based on the scavenging enable signal. When scavenging is enabled, the scavenging module 226 generates a scavenging request and a scavenging A/F ratio. The scavenging request is sent to a phaser scheduling module 252 to adjust cam phaser scheduling. The scavenging A/F ratio is sent to an air control module 228, a spark control module 232, and a fuel control module 240 to adjust air and/or fuel control.

The scavenging A/F ratio may be based on $$EQR = \frac{1}{AF} = f_{EQR}(RPM) \tag{1}$$

where equivalence ratio (EQR) may be defined as an inverse of the A/F ratio (AF). The equivalence ratio (EQR) may be further defined by an equivalence ratio function ($f_{EQR}$) based on engine RPM. For example only, the equivalence ratio function ($f_{EQR}$) may be embodied as a lookup table.

The air control module 228 may determine desired actuator values for slow actuators based on the air torque request. For example, the air control module 228 may control desired manifold absolute pressure (MAP), desired throttle area, and/or desired air per cylinder (APC). Desired MAP may be used to determine desired boost and desired APC may be used to determine desired cam phaser positions. In various implementations, the air control module 228 may also determine an amount of opening of the EGR valve 170.

In gas systems, the actuation module 224 may also generate a spark torque request, a cylinder shut-off torque request, and a fuel mass torque request. The spark torque request may be used by the spark control module 232 to determine how much to retard the spark (which reduces the engine torque output) from a calibrated spark advance.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly. The cylinder control module 236 may also instruct the fuel control module 240 to stop providing fuel for deactivated cylinders and may instruct the spark control module 232 to stop providing spark for deactivated cylinders.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders, without stopping the opening and closing of the intake and exhaust valves. In such implementations, the cylinder actuator module 120 may be omitted.

The fuel mass torque request may be used by the fuel control module 240 to vary the amount of fuel provided to each cylinder. For example only, the fuel control module 240 may determine a fuel mass that, when combined with the current amount of air per cylinder, yields stoichiometric combustion. The fuel control module 240 may instruct the fuel actuator module 124 to inject this fuel mass for each activated cylinder. During normal engine operation, the fuel control module 240 may attempt to maintain a stoichiometric A/F ratio. However, during scavenging operation, the fuel control module 240 may attempt to maintain the scavenging A/F ratio.

The fuel control module 240 may increase the fuel mass above the stoichiometric value to increase engine torque output and may decrease the fuel mass to decrease engine torque output. In various implementations, the fuel control module 240 may receive a desired A/F ratio that differs from stoichiometry. The fuel control module 240 may then determine a fuel mass for each cylinder that achieves the desired A/F ratio. In diesel systems, fuel mass may be the primary actuator for controlling engine torque output.

The approach the actuation module 224 takes in achieving the immediate torque request may be determined by a mode setting. The mode setting may be provided to the actuation module 224, such as by the propulsion torque arbitration module 206, and may select modes including an inactive mode, a pleasible mode, a maximum range mode, and an auto actuation mode.

In the inactive mode, the actuation module 224 may ignore the immediate torque request and attempt to achieve the predicted torque request. The actuation module 224 may therefore set the spark torque request, the cylinder shut-off torque request, and the fuel mass torque request to the predicted torque request, which maximizes torque output for the current engine air flow conditions. Alternatively, the actuation module 224 may set these requests to predetermined (such as out-of-range high) values to disable torque reductions from retarding spark, deactivating cylinders, or reducing the fuel/air ratio.

In the pleasible mode, the actuation module 224 may attempt to achieve the immediate torque request by adjusting only spark advance. The actuation module 224 may therefore output the predicted torque request as the air torque request and the immediate torque request as the spark torque request. The spark control module 232 will retard the spark as much as possible to attempt to achieve the spark torque request. If the desired torque reduction is greater than the spark reserve capacity (the amount of torque reduction achievable by spark retard), the torque reduction may not be achieved.

In the maximum range mode, the actuation module 224 may output the predicted torque request as the air torque request and the immediate torque request as the spark torque request. In addition, the actuation module 224 may generate a cylinder shut-off torque request that is low enough to enable the spark control module 232 to achieve the immediate torque request. In other words, the actuation module 224 may decrease the cylinder shut-off torque request (thereby deactivating cylinders) when reducing spark advance alone is unable to achieve the immediate torque request.

In the auto actuation mode, the actuation module 224 may decrease the air torque request based on the immediate torque request. For example, the air torque request may be reduced only so far as is necessary to allow the spark control module 232 to achieve the immediate torque request by adjusting spark advance. Therefore, in auto actuation mode, the immediate torque request is achieved while allowing the engine 102 to return to the predicted torque request as quickly as possible. In other words, the use of relatively slowly-responding throttle valve corrections is minimized by reducing the quickly-responding spark advance as much as possible.

A torque estimation module 244 may estimate torque output of the engine 102. This estimated torque may be used by the air control module 228 to perform closed-loop control of engine air flow parameters, such as MAP, throttle area, and phaser positions. For example only, a torque relationship such as $$T=f(APC, S, I, E, AF, OT, \#) \quad (2)$$

may be defined, where torque (T) is a function of air per cylinder (APC), spark advance (S), intake cam phaser position (I), exhaust cam phaser position (E), A/F ratio (AF), oil temperature (OT), and number of activated cylinders (#). Additional variables may be accounted for, such as the degree of opening of an exhaust gas recirculation (EGR) valve.

This relationship may be modeled by an equation and/or may be stored as a lookup table. The torque estimation module 244 may determine APC based on measured MAF and current RPM, thereby allowing closed loop air control based on actual air flow. The intake and exhaust cam phaser positions used may be based on actual positions, as the phasers may be traveling toward desired positions. In addition, a calibrated spark advance value may be used. This estimated torque may be referred to as an air torque—i.e., an estimate of how much torque could be generated at the current air flow, regardless of the actual engine torque output, which varies based on spark advance.

The air control module 228 may generate a desired manifold absolute pressure (MAP) signal, which is output to a boost scheduling module 248. The boost scheduling module 248 uses the desired MAP signal to control the boost actuator module 164. The boost actuator module 164 then controls one or more turbochargers and/or superchargers.

The air control module 228 may generate a desired area signal, which is output to the throttle actuator module 116. The throttle actuator module 116 then regulates the throttle valve 112 to produce the desired throttle area. The air control module 228 may use the estimated torque and/or the MAF signal in order to perform closed loop control. For example, the desired area signal may be controlled based on a comparison of the estimated torque and the air torque request.

The air control module 228 may also generate a desired air per cylinder (APC) signal which is output to the phaser scheduling module 252. Based on the desired APC signal, the scavenging request, and engine RPM, the phaser scheduling module 252 may control positions of the intake and/or exhaust cam phasers 148 and 150 using the phaser actuator module 158. For example, the phaser scheduling module 252 may control positions of the intake and/or exhaust cam phasers 148 and 150 according to a normal phaser schedule or a scavenging cam phaser schedule.

Referring back to the spark control module 232, spark advance values may be calibrated at various engine operating conditions. For example only, a torque relationship may be inverted to solve for desired spark advance. For a given torque request ($T_{des}$), the desired spark advance ($S_{des}$) may be determined based on $$S_{des} = T^{-1}(T_{des}, APC, I, E, AF, OT, \#) \tag{3}$$

This relationship may be embodied as an equation and/or as a lookup table. The A/F ratio (AF) may be the actual ratio, as indicated by the fuel control module 240.

However, when scavenging is enabled the desired spark advance may be modified to compensate for the scavenging A/F ratio. The desired spark advance ($S_{des}$) may be modified based on $$S_{des} = S_{normal} + \Delta S_{Seqr}(EQR) \tag{4}$$

where the desired spark advance ($S_{des}$) is based on normal spark advance $S_{normal}$ and a spark timing modification $\Delta S_{eqr}$ based on the equivalence ratio (EQR). For example, the normal spark advance $S_{normal}$ may correspond to a spark timing for a stoichiometric A/F ratio (e.g. 14.7:1).

When the spark advance is set to the calibrated spark advance, the resulting torque may be as close to mean best torque (MBT) as possible. MBT refers to the maximum torque that is generated for a given air flow as spark advance is increased, while using fuel having an octane rating greater than a predetermined threshold. The spark advance at which this maximum torque occurs may be referred to as MBT spark. The calibrated spark advance may differ from MBT spark because of, for example, fuel quality (such as when lower octane fuel is used) and environmental factors. The torque at the calibrated spark advance may therefore be less than MBT.

Figure 4:
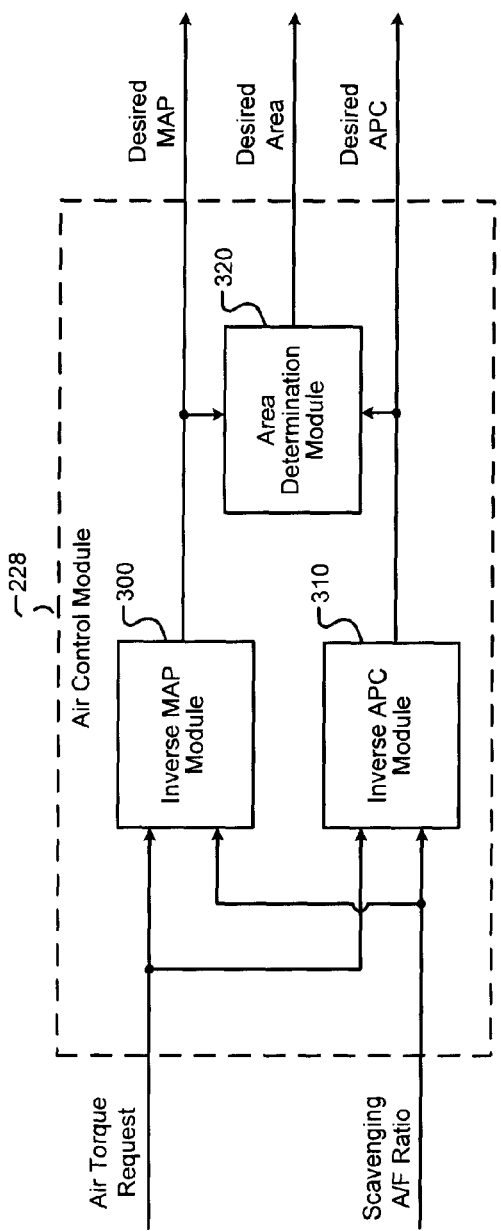
FIG. 4 is a functional block diagram of an exemplary air control module according to present disclosure.

Referring now to FIG. 4, the air control module 228 is shown in more detail. The air control module 228 includes an inverse MAP module 300, an inverse APC module 310, and an area determination module 320.

The inverse MAP module 300 generates the desired MAP based on $$MAP_{Des} = T_{map}^{-1}((T_{ref} + f(\Delta T)), R, S, I, E, AF, OT, \#) \tag{5}$$

where the desired MAP ($MAP_{des}$) is based on an inverse torque model ($T_{map}^{-1}$). The inverse torque model ($T_{map}^{-1}$) is a function of reference torque ($T_{ref}$), filtered torque difference $f(\Delta T)$, engine RPM (R), spark advance (S), intake cam phaser position (I), exhaust cam phaser position (E), A/F ratio (AF), oil temperature (OT), and number of activated cylinders (#). Additional variables may be accounted for, such as the degree of opening of an exhaust gas recirculation (EGR) valve.

The filtered torque difference $f(\Delta T)$ represents a filtered difference between MAP and APC based torque estimators. The A/F ratio (A/F) may be either normal A/F scheduling (e.g. stoichiometric) or scavenging A/F scheduling.

The inverse APC module 310 generates the desired APC based on $$APC_{des} = T_{apc}^{-1}(T_{ref}, R, S, I, E, AF, OT, \#) \tag{6}$$

where the desired APC ($APC_{des}$) is based on an inverse torque model ($T_{apc}^{-1}$). The inverse torque model ($T_{apc}^{-1}$) is a function of reference torque ($T_{ref}$), engine RPM (R), spark advance (S), intake cam phaser position (I), exhaust cam phaser position (E), A/F ratio (AF), oil temperature (OT), and number of activated cylinders (#). Additional variables may be accounted for such as the degree of opening of an exhaust gas recirculation (EGR) valve.

The area determination module 320 generates the desired area based on $$Area_{des} = \frac{APC_{des} \times R \times \sqrt{R_{gas} \times T}}{B \times k \times \Phi\left(\frac{MAP_{des}}{B}\right)} \tag{7}$$

where the desired area ($Area_{des}$) is based on a compressible flow model. The compressible flow model is based on desired APC ($APC_{des}$), engine RPM (R), ideal gas constant ($R_{gas}$), air temperature (T), desired MAP ($MAP_{des}$), and other constants (B, k).

Figure 5:
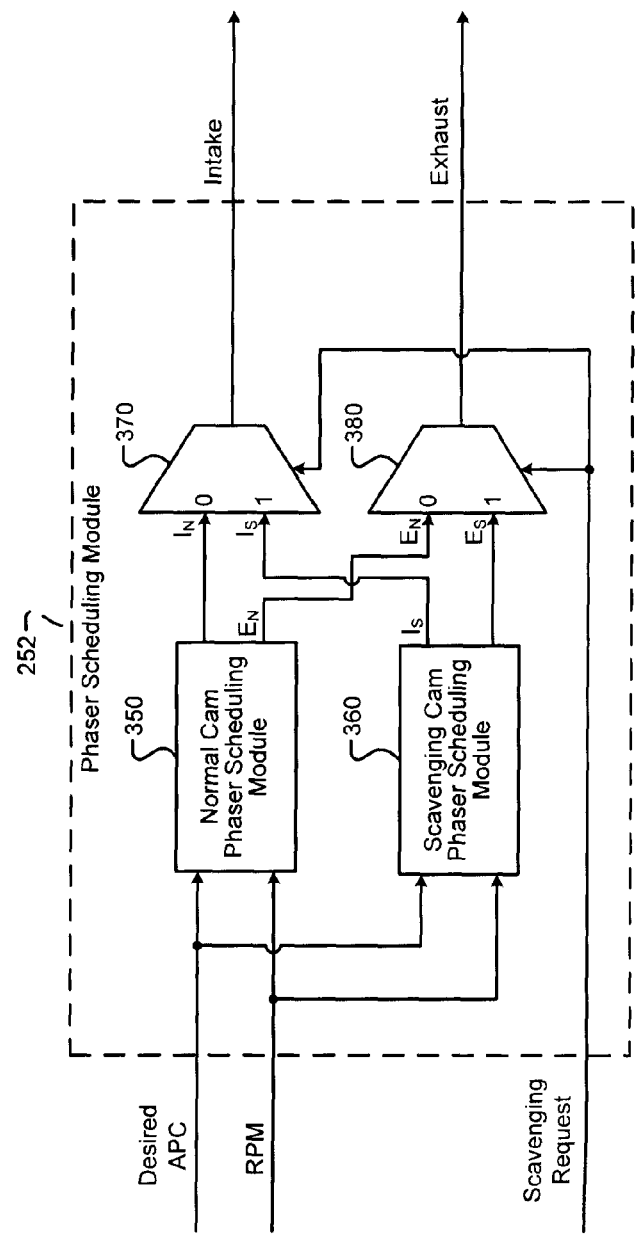
FIG. 5 is a functional block diagram of an exemplary phaser scheduling module according to the present disclosure.

Referring now to FIG. 5, the phaser scheduling module 252 is shown in more detail. The phaser scheduling module 252 includes a normal cam phaser scheduling module 350, a scavenging cam phaser scheduling module 360, and two multiplexers 370, 380.

The normal cam phaser schedule module 350 generates intake and exhaust cam phaser schedules based on $$I_n = f_{In}(R, APC_{des}) \tag{8}$$
$$E_n = f_{En}(R, APC_{des})$$

where the normal intake cam phaser schedule ($I_n$) is based on a function ($f_{in}$) of engine RPM (R) and the desired APC ($APC_{des}$). The normal exhaust cam phaser schedule ($E_n$) is based on a function $f_{(En)}$ of engine RPM (R) and the desired APC ($APC_{des}$).

The scavenging cam phaser schedule module 360 generates intake and exhaust cam phaser schedules based on $$I_S = f_{Is}(R,\ APC_{des}) \qquad (9)$$

$$E_S = f_{Es}(R,\ APC_{des})$$

where the scavenging intake cam phaser schedule ($I_s$) is based on a function ($f_{Is}$) of engine RPM (R) and the desired APC ($APC_{des}$). The scavenging exhaust cam phaser schedule ($E_s$) is based on a function ($f_{Es}$) of engine RPM (R) and the desired APC ($APC_{des}$).

The multiplexers 370, 380 select either the normal cam phaser schedules $I_n$, $E_n$ or the scavenging cam phaser schedules $I_s$, $E_s$ based on the scavenging request. The multiplexers 370, 380 determine the final cam phaser schedules as follows:

$$\begin{bmatrix} \text{Intake} \\ \text{Exhaust} \end{bmatrix} = \begin{bmatrix} I_n,\ E_n,\ \text{Scavenging} = 0 \\ I_s,\ E_s,\ \text{Scavenging} = 1 \end{bmatrix}. \qquad (10)$$

In other words, the multiplexers 370, 380 select normal cam phaser schedules $I_n$, $E_n$ when the scavenging request is low (0) and select scavenging cam phaser schedules $I_s$, $E_s$ when the scavenging request is high (1).

Figure 6:
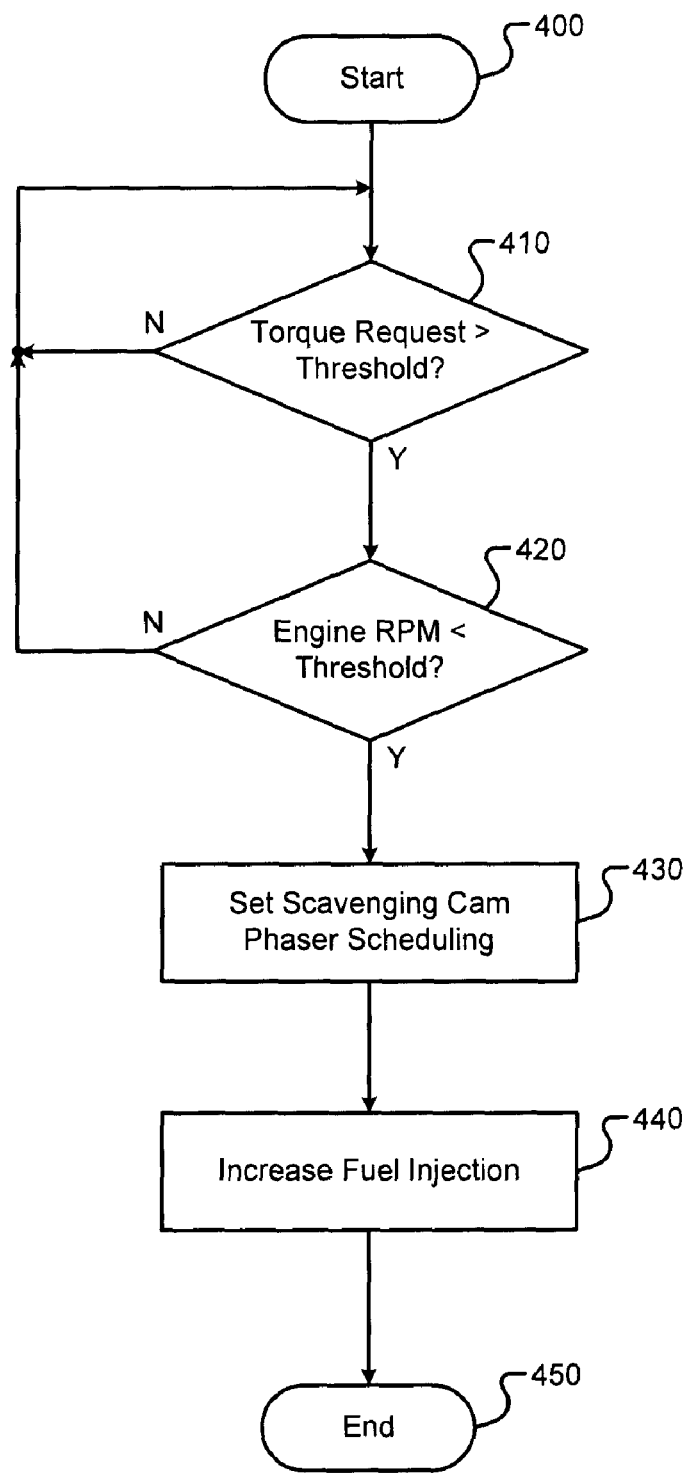
FIG. 6 is a flow diagram illustrating a method of operating the engine system according to the present disclosure.

Referring now to FIG. 6, a flow diagram illustrating a method of operating the engine system 100 begins in step 400. In step 410, the engine control module 114 determines whether a driver torque request is greater than a predetermined torque threshold. If yes, control proceeds to step 420. If no, control returns to step 410.

In step 420, the engine control module 114 determines whether a revolutions-per-minute (RPM) of an engine crankshaft is less than a predetermined speed threshold. If yes, control proceeds to step 430. If no, control returns to step 410.

In step 430, the engine control module 114 sets intake and exhaust cam phaser schedules for scavenging. For example only, the engine control module 114 may switch to predetermined scavenging cam phaser schedules. The intake and exhaust cam phaser schedules may overlap, which corresponds to intake and exhaust valves being open simultaneously.

In step 440, the engine control module 114 increases fuel injection based on mass air flow (MAF). For example only, the MAF may increase during the overlap of the phaser schedules (i.e. during scavenging) due to increased airflow through the cylinders. The increased fuel injection, in addition to the increased MAF, may result in more torque after combustion. Control then ends in step 450.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. An engine control system, comprising:
a scavenging module that generates a scavenging signal when both a driver torque request is greater than a predetermined torque threshold and a rotational speed of an engine crankshaft is less than a predetermined speed threshold; and
a cam phaser control module that controls intake and exhaust cam phasers based on the scavenging signal such that opening times of intake and exhaust valves of a respective cylinder overlap.

2. The engine control system of claim 1, further comprising:
a fuel control module that increases fuel injection based on an increased mass air flow (MAF) during the overlap.

3. The engine control system of claim 1, wherein a turbocharger spool time decreases during the overlap.

4. The engine control system of claim 1, wherein the predetermined speed threshold is based on a rotational speed of the engine crankshaft when an intake manifold pressure equals an exhaust manifold pressure.

5. The engine control system of claim 1, wherein the driver torque request is based on an accelerator pedal position.

6. The engine control system of claim 1, wherein the overlap is zero when the driver torque request is less than or equal to the predetermined torque threshold.

7. The engine control system of claim 1, wherein the overlap is zero when the rotational speed of the engine crankshaft is greater than or equal to the predetermined speed threshold.

8. A method, comprising:
generating a scavenging signal when both a driver torque request is greater than a predetermined torque threshold and a rotational speed of an engine crankshaft is less than a predetermined speed threshold; and
controlling intake and exhaust cam phasers based on the scavenging signal such that opening times of intake and exhaust valves of a respective cylinder overlap.

9. The method of claim 8, further comprising:
increasing fuel injection based on an increased mass air flow (MAF) during the overlap.

10. The method of claim 8, wherein a turbocharger spool time decreases during the overlap.

11. The method of claim 8, wherein the predetermined speed threshold is based on a rotational speed of the engine crankshaft when an intake manifold pressure equals an exhaust manifold pressure.

12. The method of claim 8, wherein the driver torque request is based on an accelerator pedal position.

13. The method of claim 8, wherein the overlap is zero when the driver torque request is less than or equal to the predetermined torque threshold.

14. The method of claim 8, wherein the overlap is zero when the rotational speed of the engine crankshaft is greater than or equal to the predetermined speed threshold.

* * * * *